(12) United States Patent
Li et al.

(10) Patent No.: US 12,380,191 B2
(45) Date of Patent: Aug. 5, 2025

(54) INFORMATION PROCESSING SYSTEM AND INFORMATION PROCESSING METHOD

(71) Applicant: Hitachi, Ltd., Tokyo (JP)

(72) Inventors: Zisheng Li, Tokyo (JP); Masahiro Ogino, Tokyo (JP)

(73) Assignee: HITACHI, LTD., Tokyo (JP)

( * ) Notice: Subject to any disclaimer, the term of this patent is extended or adjusted under 35 U.S.C. 154(b) by 204 days.

(21) Appl. No.: 18/068,170

(22) Filed: Dec. 19, 2022

(65) Prior Publication Data

US 2023/0273984 A1    Aug. 31, 2023

(30) Foreign Application Priority Data

Feb. 25, 2022   (JP) .................... 2022-027826

(51) Int. Cl.
*G06F 21/32*    (2013.01)

(52) U.S. Cl.
CPC .................... *G06F 21/32* (2013.01)

(58) Field of Classification Search
CPC ....... G06F 21/32; G06F 16/636; G06F 16/436
See application file for complete search history.

(56) References Cited

U.S. PATENT DOCUMENTS

| | | | | |
|---|---|---|---|---|
| 5,485,402 A * | 1/1996 | Smith | ............... | G01P 13/00 |
| | | | | 702/160 |
| 5,891,042 A * | 4/1999 | Sham | ............... | A61B 5/6831 |
| | | | | 600/483 |
| 6,512,532 B2 * | 1/2003 | Sako | ............... | B41J 2/3353 |
| | | | | 347/204 |
| 7,237,446 B2 * | 7/2007 | Chan | ............... | A63B 71/06 |
| | | | | 73/865.4 |
| 8,398,546 B2 * | 3/2013 | Pacione | ............ | A61B 5/1118 |
| | | | | 128/920 |
| 8,475,367 B1 * | 7/2013 | Yuen | ............... | G16H 50/30 |
| | | | | 177/4 |
| 8,965,402 B2 * | 2/2015 | Vathsangam | ...... | H04W 4/029 |
| | | | | 455/456.1 |
| 9,619,698 B1 * | 4/2017 | Chuang | ............ | A63B 1/00 |
| 9,700,241 B2 * | 7/2017 | Eastman | ........... | A61B 5/112 |
| 9,700,260 B2 * | 7/2017 | Yamaguchi | ........ | A61B 5/486 |
| 9,907,473 B2 * | 3/2018 | Tran | ............... | A61B 5/0205 |
| 10,105,101 B2 * | 10/2018 | Fougere | ........... | A61B 5/684 |
| 10,178,973 B2 * | 1/2019 | Venkatraman | ...... | A61B 5/721 |

(Continued)

FOREIGN PATENT DOCUMENTS

| | | |
|---|---|---|
| JP | 2015-200968 A | 11/2015 |
| WO | 2021/210172 A1 | 10/2021 |

OTHER PUBLICATIONS

Klein et al.; "Encouraging Physical Activity via a Personalized Mobile System", 2015, IEEE, pp. 20-27. (Year: 2015).*

(Continued)

*Primary Examiner* — Matthew Smithers
(74) *Attorney, Agent, or Firm* — Volpe Koenig

(57) ABSTRACT

An information processing system includes: a processor that executes a program; and a storage device that stores the program, in which the storage device stores sensor data that is biological information of a user measured by a sensor and user data collected in association with the sensor data, and the processor acquires the sensor data, and imputes the sensor data using a causal relationship between the acquired sensor data and the user data.

9 Claims, 16 Drawing Sheets

(56) References Cited

U.S. PATENT DOCUMENTS

| | | | | |
|---|---|---|---|---|
| 10,512,819 B2* | 12/2019 | Kow | | A63B 24/0062 |
| 10,744,371 B2* | 8/2020 | Mohrman | | A61B 5/1118 |
| 10,945,661 B2* | 3/2021 | Walker | | A61B 5/486 |
| 11,103,747 B1* | 8/2021 | Chuang | | A63B 24/0062 |
| 11,342,051 B1* | 5/2022 | Jain | | G16H 10/60 |
| 11,350,829 B2* | 6/2022 | Yuen | | A61B 5/681 |
| 11,756,663 B2* | 9/2023 | Neumann | | G06N 20/20 |
| | | | | 705/3 |
| 11,766,213 B1* | 9/2023 | Kahn | | A61B 5/4818 |
| | | | | 600/529 |
| 12,119,115 B2* | 10/2024 | Foschini | | G16H 50/20 |
| 2009/0190713 A1 | 7/2009 | Wai | | G01C 22/006 |
| | | | | 600/509 |
| 2013/0246021 A1* | 9/2013 | Ura | | G06F 30/20 |
| | | | | 703/2 |
| 2014/0135592 A1* | 5/2014 | Ohnemus | | A61B 5/4266 |
| | | | | 600/595 |
| 2014/0157349 A1* | 6/2014 | Robinson | | H04L 67/54 |
| | | | | 726/1 |
| 2015/0106052 A1* | 4/2015 | Balakrishnan | | A61B 5/6823 |
| | | | | 702/150 |
| 2016/0063387 A1* | 3/2016 | Srivastava | | G06N 5/048 |
| | | | | 709/204 |
| 2016/0310049 A1* | 10/2016 | Rowe | | A61B 5/681 |
| 2016/0357173 A1* | 12/2016 | Foschini | | G16H 50/70 |
| 2017/0023519 A1* | 1/2017 | Rowe | | A61B 5/0537 |
| 2017/0367558 A1* | 12/2017 | Fukazawa | | A61B 1/0684 |
| 2018/0321640 A1* | 11/2018 | Miyoshi | | G06F 3/03547 |
| 2018/0344215 A1* | 12/2018 | Ohnemus | | A61B 5/1118 |
| 2019/0336824 A1* | 11/2019 | Fung | | A63B 22/0285 |
| 2019/0380628 A1* | 12/2019 | Routh | | G16H 80/00 |
| 2020/0129121 A1* | 4/2020 | Franzi | | A61B 5/4806 |
| 2020/0175056 A1* | 6/2020 | Fox | | A61B 5/4848 |
| 2021/0034724 A1* | 2/2021 | Fong | | G06V 40/25 |
| 2021/0064134 A1* | 3/2021 | Rofougaran | | G06T 19/006 |
| 2021/0113099 A1* | 4/2021 | Rogers | | A61B 5/682 |
| 2021/0169417 A1* | 6/2021 | Burton | | A61B 5/4857 |
| 2021/0275034 A1* | 9/2021 | Frank | | G01J 5/34 |
| 2022/0021660 A1* | 1/2022 | Trieflinger | | H04L 63/0414 |
| 2022/0037034 A1* | 2/2022 | Stanescu | | G16H 50/70 |
| 2023/0078426 A1* | 3/2023 | Gottesman | | A61B 5/318 |
| | | | | 600/301 |
| 2023/0139218 A1 | 5/2023 | Fukushi et al. | | |
| 2023/0245777 A1* | 8/2023 | Foschini | | G16H 50/30 |
| | | | | 705/2 |
| 2023/0329630 A1* | 10/2023 | Patel | | A61B 5/08 |

OTHER PUBLICATIONS

Song et al.; "Tempo-Spatial Compressed Sensing of Organ-on-a-Chip for Pervasive Health", Mar. 2018, IEEE Journal of Biomedical and Health Informatics, vol. 22, No. 2, pp. 326-334. (Year: 2018).*
Japanese Office Action issued on Dec. 17, 2024 for Japanese Patent Application No. 2022-027826.

* cited by examiner

FIG. 3

| ID | FACTORS (X) | | | | | | INTERVENTION DATE AND TIME | INTERVENTION CONTENT (A) | | INTERVENTION EFFECT (Y) | | |
|---|---|---|---|---|---|---|---|---|---|---|---|---|
| | SEX | AGE | BEHAVIOR | EMOTION | SENSOR DATA | ... | | TYPE | QUANTITY | EFFECT 1 | EFFECT 2 | ... |
| 1 | FEMALE | 22 | MEAL | PLEASURE/RELAX | HEART RATE ELECTRODERMAL ACTIVITY SKIN TEMPERATURE ACCELERATION AMOUNT OF ACTIVITY LOCATION INFORMATION ... | ... | 2021/7/1 | 1 | 0.2 | 0.6 | 0.4 | ... |
| | | | EXERCISE | ACTIVE | | | 2021/7/2 | 1 | 0.5 | 0.6 | 0.3 | ... |
| | | | ... | ... | | | ... | ... | ... | ... | ... | ... |
| | | | SLEEP | RELAX | | | 2021/7/20 | 2 | 0.5 | 0.8 | 0.5 | ... |
| 2 | MALE | 35 | INTERPERSONAL EXCHANGE | PLEASURE/ACTIVE | | | 2021/7/20 | 3 | 0.6 | 0.7 | 0.6 | ... |
| | | | ... | ... | | | 2021/7/20 | 0 | 0 | 0.2 | 0.2 | ... |
| ... | | | | | | | | ... | ... | ... | ... | ... |

| GRAPH NODE | NODE FEATURE |
|---|---|
| EMOTION | 563⋯42 |
| BEHAVIOR | 982⋯53 |
| ACCELERATION DATA | 751⋯04 |
| HEART RATE DATA | 873⋯90 |
| INTERVENTION METHOD AND INTERVENTION EFFECT | ⋯ |
| USER ATTRIBUTE | ⋯ |
| ⋯ | ⋯ |

FIG. 7B

| GRAPH EDGE | EDGE FEATURE |
|---|---|
| EMOTION–HEART RATE DATA | 253⋯52 |
| BEHAVIOR–HEART RATE DATA | 583⋯46 |
| EMOTION–ACCELERATION DATA | 964⋯57 |
| BEHAVIOR–ACCELERATION DATA | 210⋯29 |
| BEHAVIOR–INTERVENTION METHOD AND INTERVENTION EFFECT | ⋯ |
| INTERVENTION METHOD AND INTERVENTION EFFECT–HEART RATE DATA | ⋯ |
| ⋯ | ⋯ |

# INFORMATION PROCESSING SYSTEM AND INFORMATION PROCESSING METHOD

CROSS-REFERENCE TO RELATED APPLICATIONS

The present invention claims priority under 35 U.S.C. § 119 to Japanese Patent Application No. 2022-027826, filed on Feb. 25, 2022, the entire content of which is incorporated herein by reference.

BACKGROUND OF THE INVENTION

1. Field of the Invention

The present invention relates to an information processing system, and more particularly, to a technique of imputing missing of biological data obtained by measuring a user and of proposing an appropriate intervention measure.

2. Description of the Related Art

In a case of imputing missing of biological data obtained by measuring the user, filtering or a machine learning model using measurement data before and after a missing value is used.

The background art of the present technical field includes the following prior art. JP 2015-200968 A describes a walking information management system that includes a processing unit that: searches both a walking information database and a position information database and retrieves time in which both walking information and position information exist; calculates moving speed, moving distance and moving time on the basis of movement information and the time thereof; calculates walking speed, stride and walking rate from the moving speed, the moving distance and the number of steps, with respect to a period when the calculated moving speed is approximately constant; and calculates an expression for relation among the calculated walking speed, stride and walking rate. With respect to the period when a user moves on foot and which is determined to have no walking information, the processing unit calculates moving speed and moving time on the basis of user's position information, calculates the walking rate by assigning the calculated moving speed to an expression for relation between the walking speed and the walking rate, and then calculates the number of steps by multiplying the calculated walking rate by the moving time.

SUMMARY OF THE INVENTION

In the above-described prior art, since changes due to an intervention measure and other influential factors are not taken into consideration in the imputation of measurement data, there is a case where accuracy of causal inference using imputed data decreases.

The present invention proposes an imputation method of measurement data capable of suppressing a decrease in accuracy of causal inference using imputed data.

A representative example of the invention disclosed in the present application is as follows. That is, an information processing system including: a calculation device that executes a program; and a storage device that stores the program, wherein the storage device stores user data that includes sensor data that is biological information of a user measured by a sensor device and data collected in association with the sensor data, and the calculation device acquires the sensor data, and imputes the acquired sensor data using a causal relationship between items of the user data.

According to one aspect of the present invention, missing data can be accurately predicted. Problems, configurations, and effects other than those described above will be made clear by the description of the following examples.

BRIEF DESCRIPTION OF THE DRAWINGS

FIG. 3 is a diagram illustrating a configuration example of user data of an example of the present invention;

FIG. 7A is a diagram illustrating an example of nodes constituting a graph and a node feature;

FIG. 7B is a diagram illustrating an example of edges constituting a graph and an edge feature;

DESCRIPTION OF THE PREFERRED EMBODIMENTS

Example 1

Figure 1:
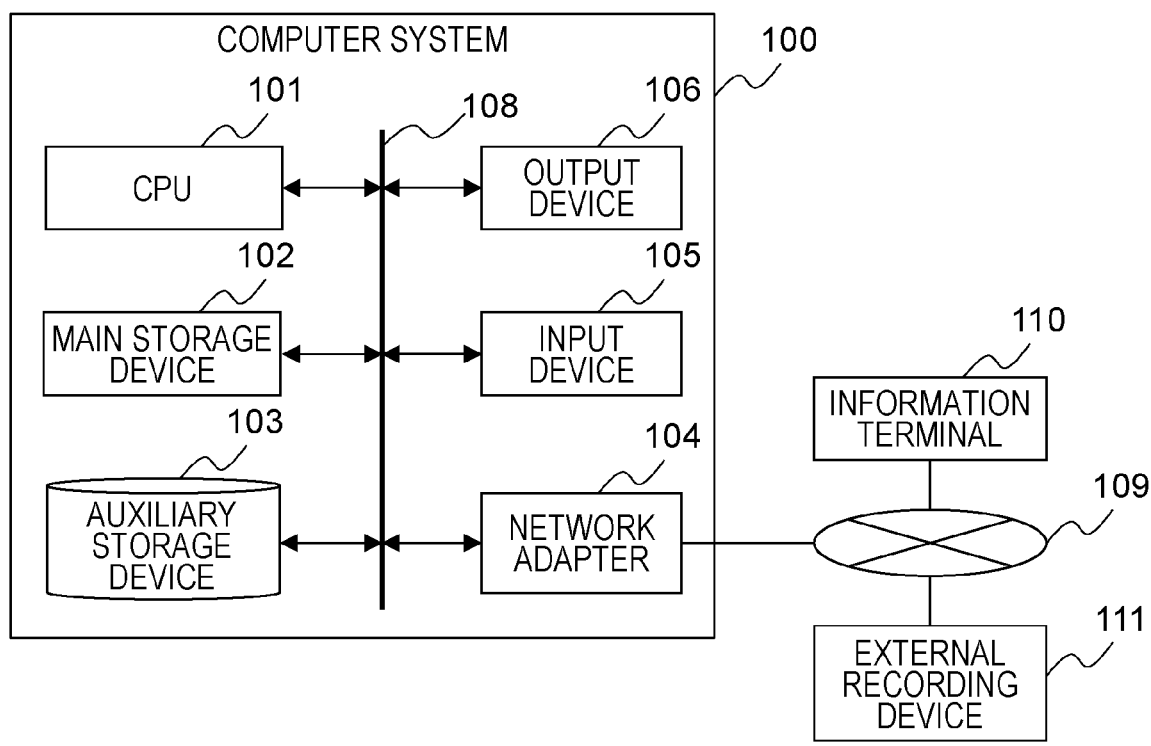
FIG. 1 is a block diagram illustrating a physical configuration of a computer system of an example of the present invention.

FIG. 1 is a block diagram illustrating the physical configuration of a computer system 100 of the present example.

The computer system 100 of the present example, which is an example of an information processing system of the present invention, includes a computer that has a processor (CPU) 101, a main storage device 102, an auxiliary storage device 103, a network adapter 104, an input device 105, and an output device 106.

The processor 101 executes a program (for example, a program that implements a training section 200 and a prediction section 201) stored in the main storage device 102. The main storage device 102 includes a ROM that is a nonvolatile storage element and a RAM that is a volatile storage element. The ROM stores an invariable program (for example, BIOS) and the like. The RAM is a high-speed and volatile storage element such as a dynamic random access memory (DRAM), and temporarily stores a program executed by the processor 101 and data (for example, a trained model and a feature) used at the time of executing the program.

The auxiliary storage device 103 is, for example, a large-capacity and nonvolatile storage device such as a magnetic storage device (HDD) or a flash memory (SSD), and stores a program executed by the processor 101 and data used at the time of executing the program. That is, the program is read from the auxiliary storage device 103, loaded into the main storage device 102, and executed by the processor 101.

The network adapter 104 is a communication interface device that controls communication with other devices (an information terminal 110, an external storage device 111, and the like) via a network 109 in accordance with a predetermined protocol.

The input device 105 is an interface device that receives data input (for example, meta information) from the user such as a keyboard, a mouse, or a touchscreen. The output device 106 is an interface device that outputs a program execution result (for example, sensor data imputation result, and intervention effect prediction) in a format that can be visually recognized by an operator, such as a display device or a printer. A user terminal (for example, the information terminal 110) connected to the computer system 100 via the network 109 may provide the input device 105 and the output device 106. In this case, the computer system 100 may have a function of a web server, and the user terminal may access the computer system 100 with a predetermined protocol (for example, http).

The program executed by the processor 101 is provided to the computer system 100 via a removable medium (a CD-ROM, a flash memory, and the like) or a network, and is stored in the nonvolatile auxiliary storage device 103 that is a non-transitory storage medium. Therefore, the computer system 100 preferably has an interface for reading data from a removable medium.

The computer system 100 is a computer system configured on physically one computer or on a plurality of logically or physically configured computers, and may also operate on separate threads on the same computer or may also operate on a virtual computer constructed on a plurality of physical computer resources. Each functional section of the computer system 100 may be implemented on different computers.

The information terminal 110 is a computer connected to the computer system 100 via the network 109, receives data input (for example, the meta information) from the user, and displays an execution result (for example, a sensor data imputation result, and intervention effect prediction) of the program. The information terminal 110 communicates with a sensor device worn by the user and collects sensor data measured by the sensor device. The sensor device is a wearable device such as a smart watch or an activity meter in which a heart rate sensor, an electrodermal activity sensor, a skin temperature sensor, or the like is mounted, and measures biological information of the user. The sensor device is mounted with an acceleration sensor and a positioning unit, and measures motion of the user.

The external storage device 111 includes, for example, a large-capacity and nonvolatile storage device such as a magnetic storage device (HDD) or a flash memory (SSD), and stores a program executed by the processor 101 and data used at the time of executing the program.

Figure 2:
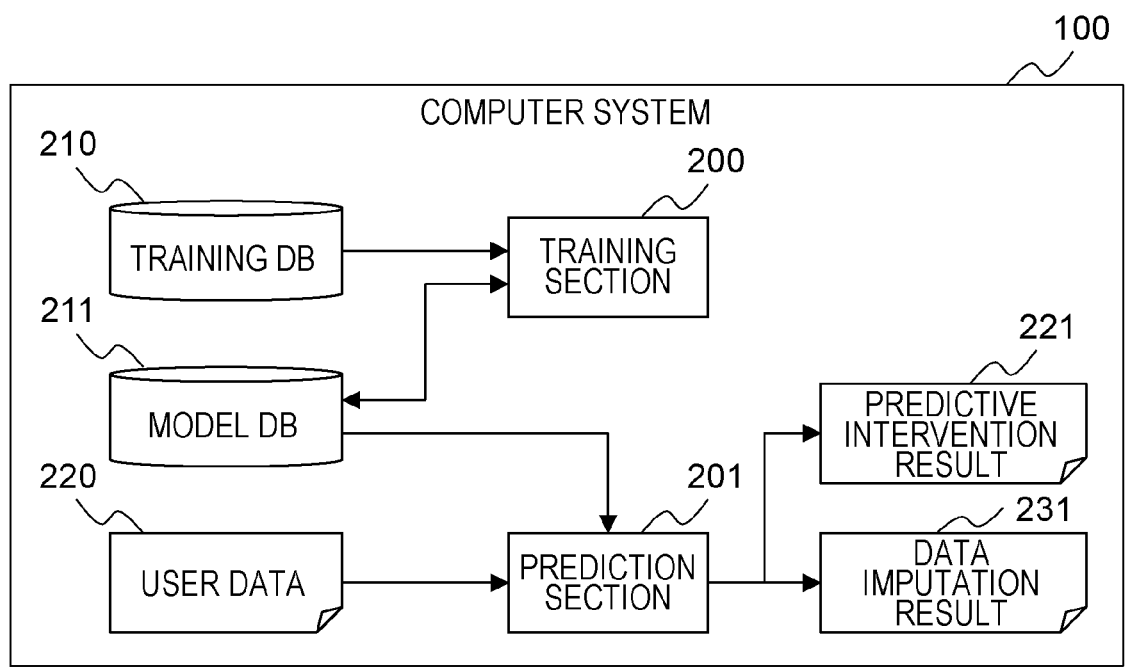
FIG. 2 is a block diagram illustrating a logical configuration of the computer system of an example of the present invention.

FIG. 2 is a block diagram illustrating a logical configuration of the computer system 100 of the present example.

The computer system 100 of the present example includes the training section 200 and the prediction section 201. The training section 200 generates a trained model using the training data stored in a training database 210 and stores the generated model in a model database 211. Using the trained model stored in the model database 211, the prediction section 201 imputes user data 220 to generate data imputation result 231, and derives a predictive intervention result 221 from the user data 220.

FIG. 3 is a diagram illustrating a configuration example of the user data 220 of the present example.

The user data 220 stores identification information (ID) for uniquely identifying the user, the sex of the user, the age of the user, the behavior of the user, the emotion of the user, the sensor data acquired from the user, and data of the intervention date and time, the intervention content, and the intervention effect in association with one another. Among them, the behavior of the user and the emotion of the user are metadata represented by text data.

The sensor data is data measured by the sensor device worn by the user, and includes numerical values such as a heart rate, an electrodermal activity, skin temperature, acceleration, an amount of activity (number of steps, METS, and the like), and location information.

The emotion is a matter that the user feels at the intervention date and time, and is data classified into a predetermined category such as pleasure, unpleasure, relax, tension, active, or stationary. The emotion may be emotion data input by the user from the information terminal 110 or estimated by the information terminal 110 from the sensor data. For example, the degree of stress can be calculated from the electrodermal activity data measured by the sensor device, and the degree of tension can be estimated.

The behavior is a motion performed by the user at the intervention date and time, and is data classified into a predetermined category such as meal, exercise, sleep, and interpersonal exchange. The behavior may be behavior data input by the user from the information terminal 110 or estimated by the information terminal 110 from the sensor data. For example, behaviors such as walking, light work, and sleeping can be estimated from the acceleration data measured by the sensor device.

Figure 4:
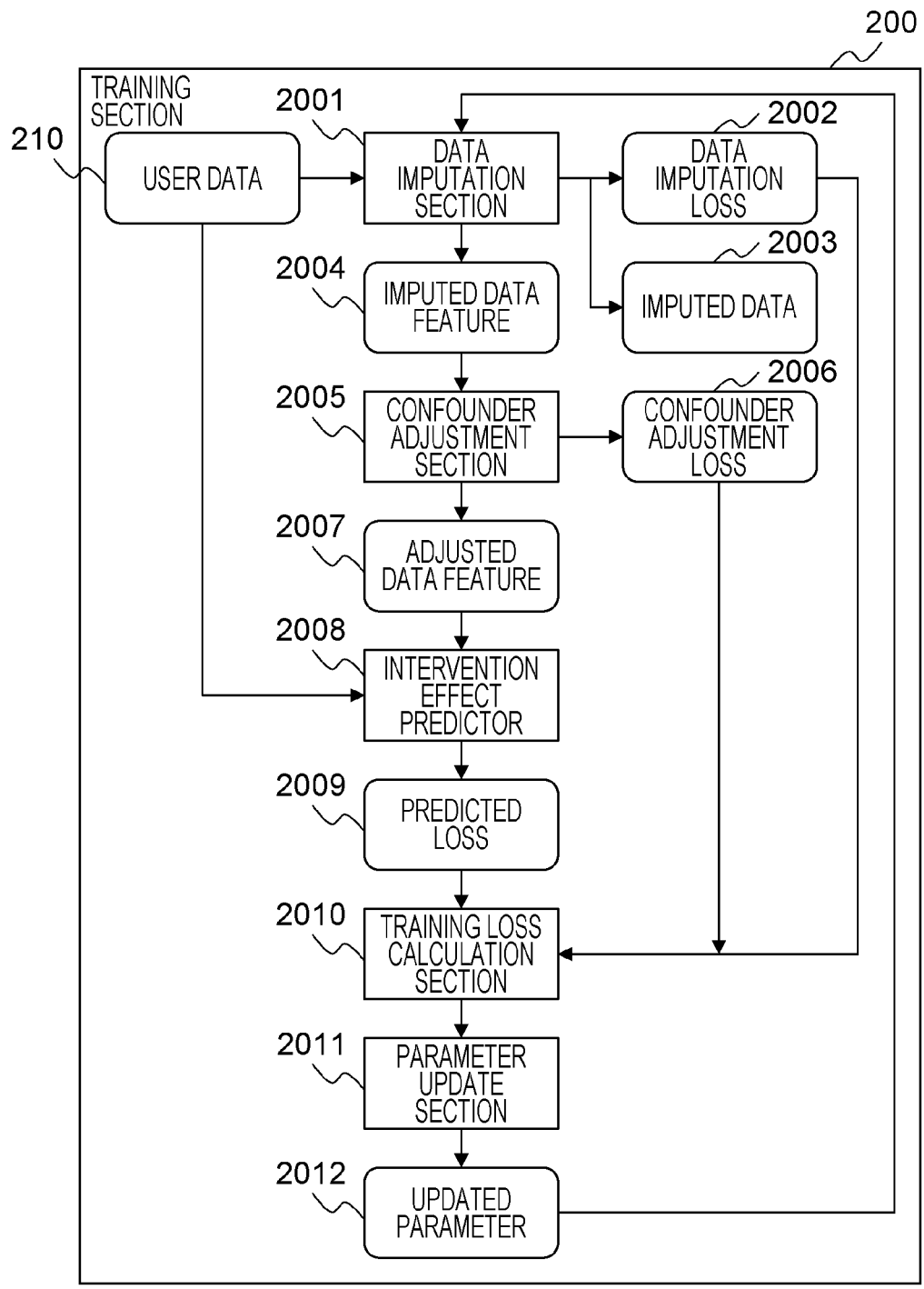
FIG. 4 is a diagram illustrating a configuration of a training section of Example 1.

FIG. 4 is a diagram illustrating the configuration of the training section 200 of Example 1.

The training section 200 includes a data imputation section 2001, a confounder adjustment section 2005, an intervention effect predictor 2008, a training loss calculation section 2010, and a parameter update section 2011, and trains a model using sensor data.

The data imputation section 2001 generates a data imputation model for inferring and imputing a missing portion of the user data 220 including missing having been input such that a data imputation loss 2002 becomes minimized, generates an imputed data feature 2004 using the generated data imputation model, and generates imputed data 2003 on the basis of the generated imputed data feature 2004. The processing of the data imputation section 2001 will be described later with reference to FIG. 5. The data imputation loss is a value of a loss function representing a loss between imputed (predicted) data and sensor data having no loss (actual), and as the loss function, for example, mean squared error, mean absolute error, or cross entropy error can be used.

The confounder adjustment section 2005 generates a confounder adjustment model for generating an adjusted data feature 2007 from the imputed data feature 2004 on the basis of the confounder between data items such that a confounder adjustment loss 2006 becomes minimized, and generates the adjusted data feature 2007 from the imputed data feature 2004 using the generated confounder adjustment model. Even in a case where there is a bias in the distribution of the intervention and the population, it becomes possible to generate the feature with a balanced distribution by reducing a difference in the distribution of the population so that all the interventions can be uniformly selected by the confounder adjustment section 2005.

The intervention effect predictor 2008 predicts an intervention effect from the adjusted data feature 2007 and generates a predicted loss 2009 that is a value of a loss function representing the prediction error. The prediction error is calculated using the user data 220 (correct answer data of the prediction effect) as correct answer data, and an intervention effect prediction model is generated so that the predicted loss becomes minimized. The predicted loss 2009 is generated from the user data 220.

The training loss calculation section 2010 calculates the training loss of the entire training section 200 from the data imputation loss 2002, the confounder adjustment loss 2006, and the predicted loss 2009. The training loss can be calculated by a value of a weighted average of weighted addition of, for example, the data imputation loss 2002, the confounder adjustment loss 2006, and the predicted loss 2009.

The parameter update section 2011 generates updated parameter 2012 such that the calculated training loss becomes minimized. By updating an inference model (a data imputation model, a confounder adjustment model, and an intervention effect prediction model) with the generated updated parameter 2012, it is possible to generate a model with a small loss, that is, capable of inference close to the correct answer data.

Figure 5:
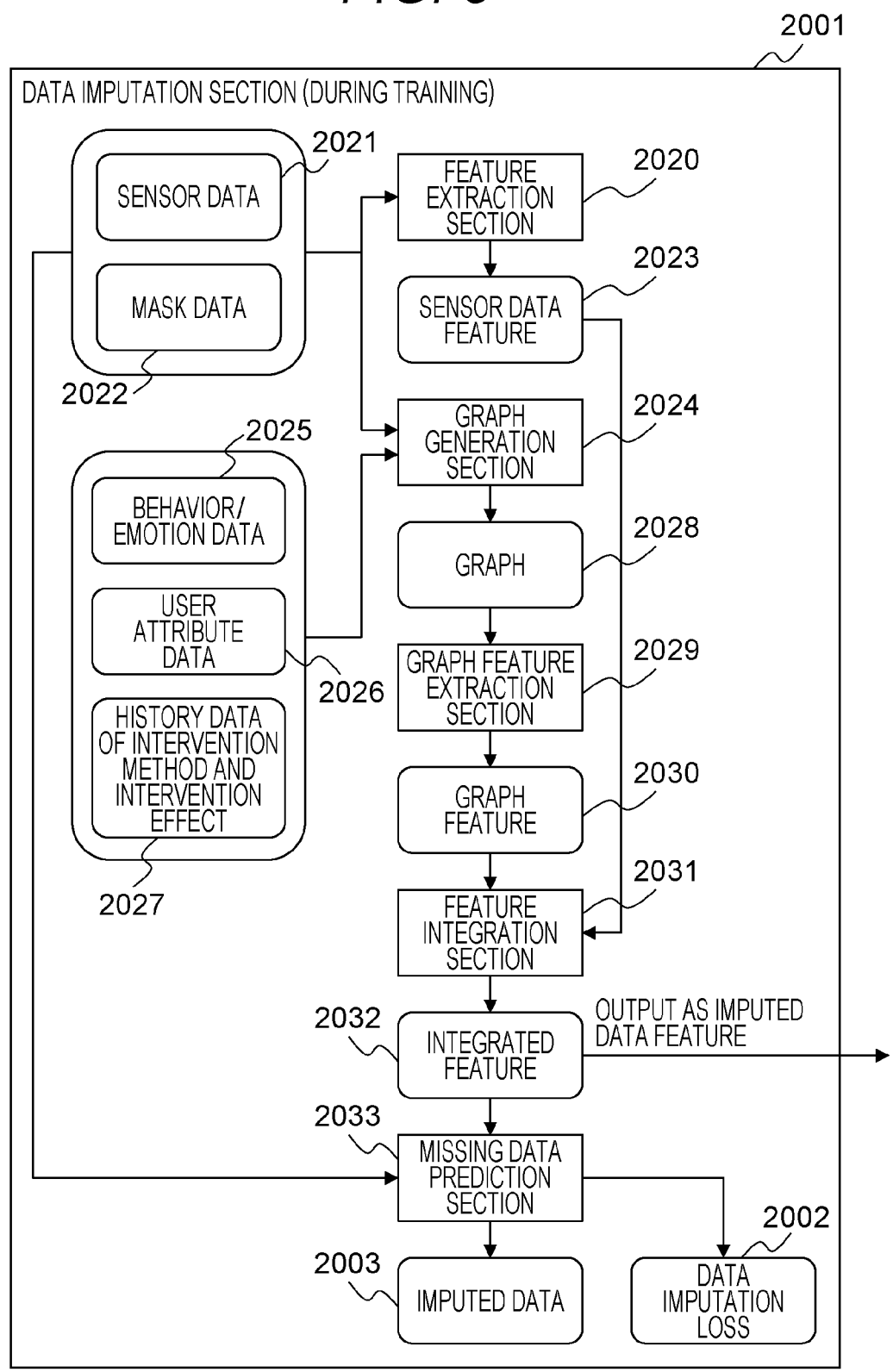
FIG. 5 is a diagram illustrating a configuration of a data imputation section of Example 1 at the time of training.

FIG. 5 is a diagram illustrating the configuration of the data imputation section 2001 of Example 1 at the time of training.

The data imputation section 2001 includes a feature extraction section 2020, a graph generation section 2024, a graph feature extraction section 2029, a feature integration section 2031, and a missing data prediction section 2033.

The feature extraction section 2020 generates a sensor data feature 2023 from sensor data 2021, and generates the sensor data feature 2023 from mask data 2022 in which a part of the sensor data 2021 is missing. That is, the sensor data feature 2023 includes the feature of the sensor data 2021 and the feature of the mask data 2022. The mask data 2022 is training data that is partially missing by applying a random mask to the sensor data 2021. The sensor data 2021 is used for training as correct answer data of the data missing by the mask.

Figure 6:
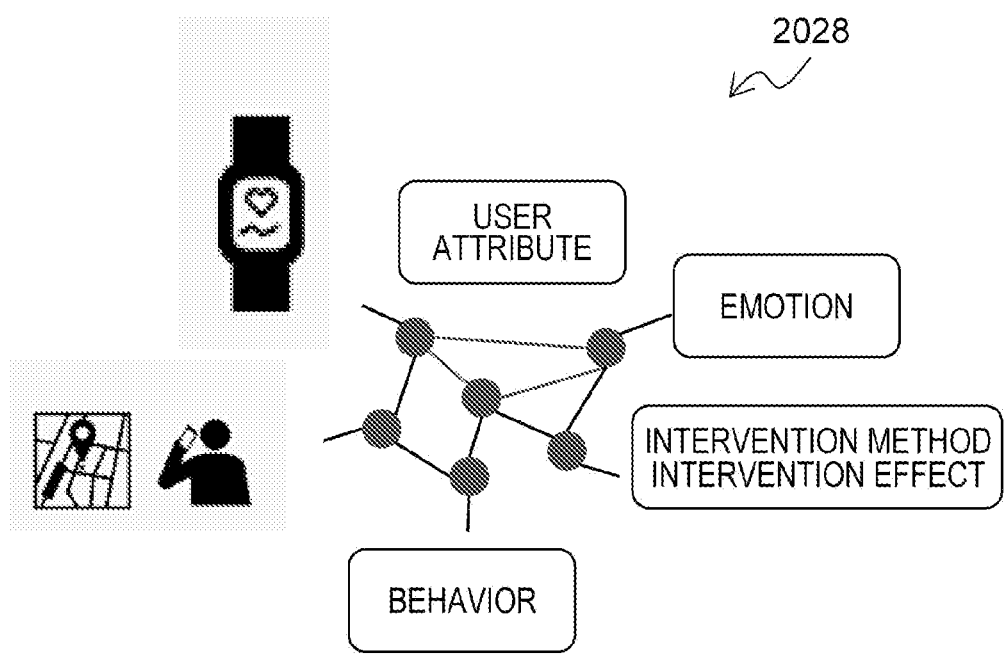
FIG. 6 is a diagram illustrating a configuration example of a graph of an example of the present invention.

The graph generation section 2024 generates a graph 2028 from the sensor data 2021, the mask data 2022, behavior/emotion data 2025, user attribute data 2026, and history data 2027 of intervention method and intervention effect. As illustrated in FIG. 6, the generated graph 2028 includes nodes corresponding to data items input to the graph generation section 2024 and edges coupling the nodes with one another. The feature of each node and each edge is calculated. The node feature represents characteristics of the data items (for example, emotion, behavior, acceleration data, heart rate data, intervention method and intervention effect, user attribute, and the like illustrated in FIG. 7A), and the edge feature represents a correlation among the data items.

Returning to FIG. 5, the description will be continued. The graph feature extraction section 2029 extracts graph feature 2030 from the generated graph 2028. The graph feature 2030 includes a node feature representing the property of a node itself and an edge feature indicating an adjacency relationship between nodes by the edge.

FIG. 7A is a diagram illustrating an example of nodes constituting the graph 2028 and the node feature, and FIG. 7B is a diagram illustrating an example of edges constituting the graph 2028 and the edge feature. The node is an item such as emotion, behavior, acceleration data, heart rate data, intervention method and intervention effect, and user attribute that are defined for each item, and the node feature is a feature of data for each item corresponding to the node. The edge is a relationship between data of items corresponding to two nodes, and is, for example, a relationship between emotion and heart rate data, a relationship between behavior and heart rate data, a relationship between emotion and acceleration data, a relationship between behavior and acceleration data, a relationship between behavior and intervention method and intervention effect, a relationship between intervention method and intervention effect and heart rate data, or the like. The edge feature is represented by a feature indicating a correlation between nodes.

Returning to FIG. 5, the description will be continued. The feature integration section 2031 calculates an integrated feature 2032 by integrating the generated sensor data feature 2023 and the extracted graph feature 2030. The calculated integrated feature 2032 is output as the imputed data feature 2004.

The missing data prediction section 2033 generates the imputed data 2003 from the integrated feature 2032 using the data imputation model. The data imputation section 2001 trains the sensor data 2021 and the mask data 2022 as correct answer data and further uses the imputed data 2003 such that the data imputation loss 2002 becomes minimized, and generates (updates) the parameter of the data imputation model.

Figure 8:
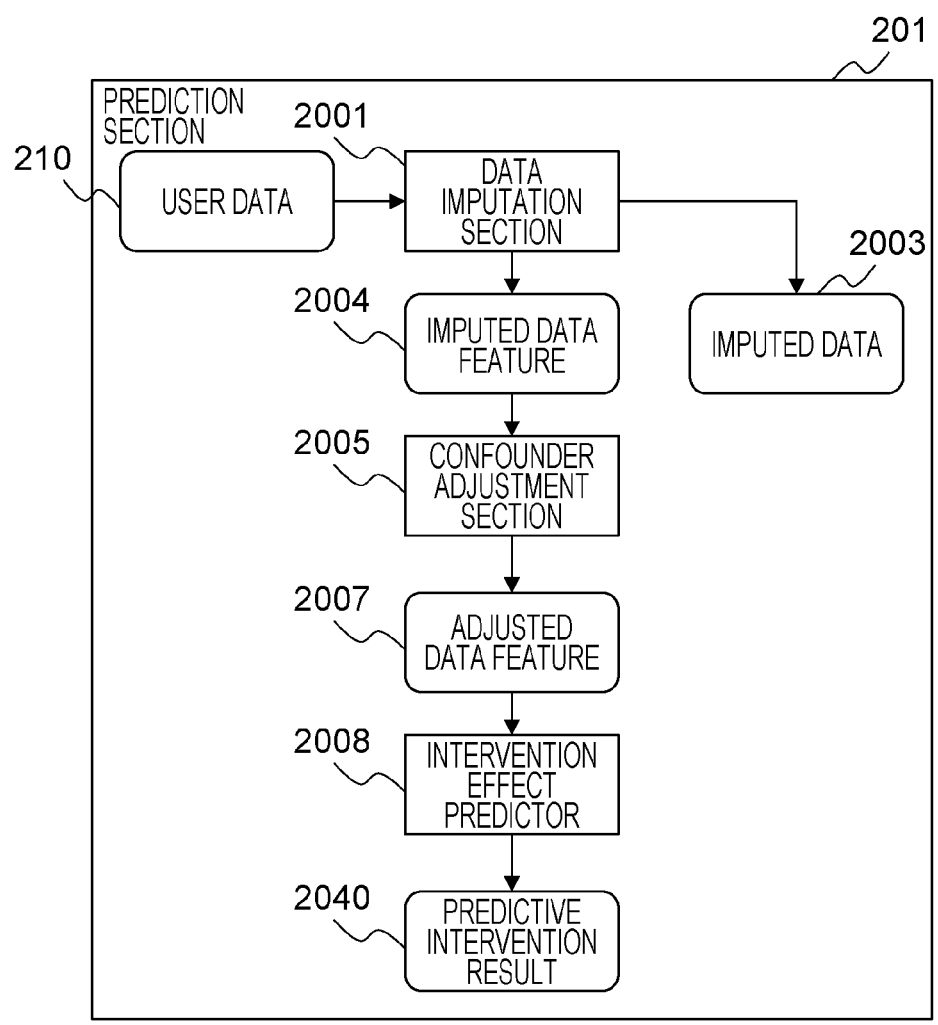
FIG. 8 is a diagram illustrating a configuration of a prediction section of Example 1.

FIG. 8 is a diagram illustrating the configuration of the prediction section 201 of Example 1.

The prediction section 201 has the data imputation section 2001, the confounder adjustment section 2005, and the intervention effect predictor 2008, and predicts the intervention effect from the user data 220. The data imputation section 2001, the confounder adjustment section 2005, and the intervention effect predictor 2008 have the same configurations as those of the training section 200.

Using the trained data imputation model, the data imputation section 2001 imputes a missing portion of the user data 220 including missing, generates the imputed data 2003, and calculates the imputed data feature 2004 from the generated imputed data 2003. The processing of the data imputation section 2001 will be described later with reference to FIG. 9.

Using the trained confounder adjustment model, the confounder adjustment section 2005 generates the adjusted data feature 2007 from the imputed data feature 2004.

The intervention effect predictor 2008 generates a predictive intervention result 2040 from the adjusted data feature 2007.

Figure 9:
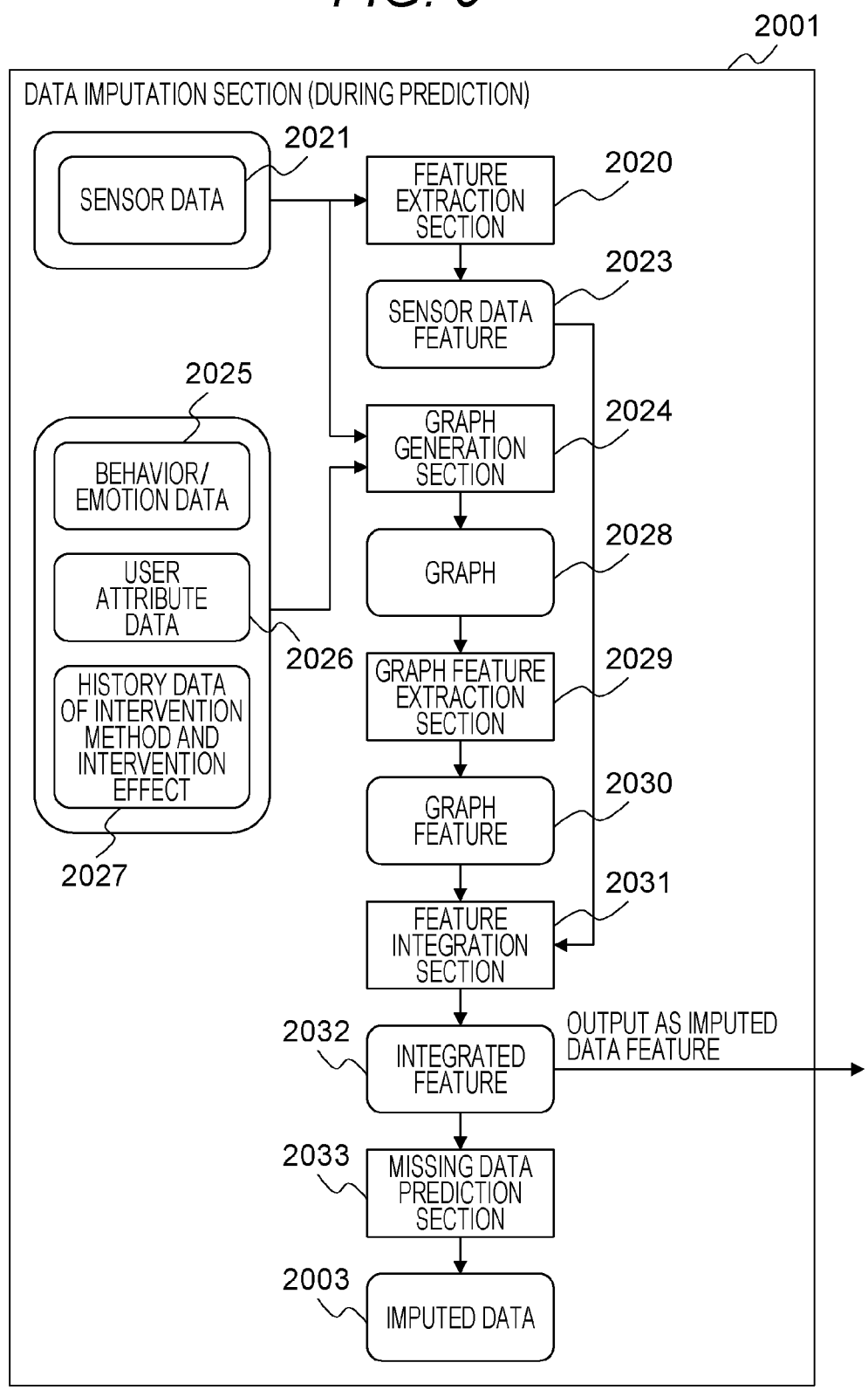
FIG. 9 is a diagram illustrating a configuration of the data imputation section of Example 1 at the time of predictive inference.

FIG. 9 is a diagram illustrating a configuration of the data imputation section 2001 of Example 1 at the time of predictive inference.

The feature extraction section 2020 generates the sensor data feature 2023 from the sensor data 2021.

The graph generation section 2024 generates the graph 2028 from the sensor data 2021, the behavior/emotion data 2025, the user attribute data 2026, and the history data 2027 of intervention method and intervention effect. As illustrated in FIG. 6, the generated graph 2028 includes nodes corresponding to data items input to the graph generation section 2024 and edges coupling the nodes with one another.

The graph feature extraction section 2029 extracts the graph feature 2030 from the generated graph 2028. The graph feature 2030 includes a node feature representing the property of a node itself and an edge feature indicating an adjacency relationship between nodes by the edge.

The feature integration section 2031 calculates the integrated feature 2032 by integrating the generated sensor data feature 2023 and the extracted graph feature 2030. The calculated integrated feature 2032 is output as the imputed data feature 2004. Integration of the sensor data feature 2023 and the graph feature 2030 representing the correlation of the user data 220 enables data imputation in consideration of the correlation among data, and can improve the accuracy of confounder adjustment and causal inference in intervention effect prediction.

Using the trained data imputation model, the missing data prediction section 2033 infers and generates the imputed data 2003 from the integrated feature 2032.

Figure 10A:
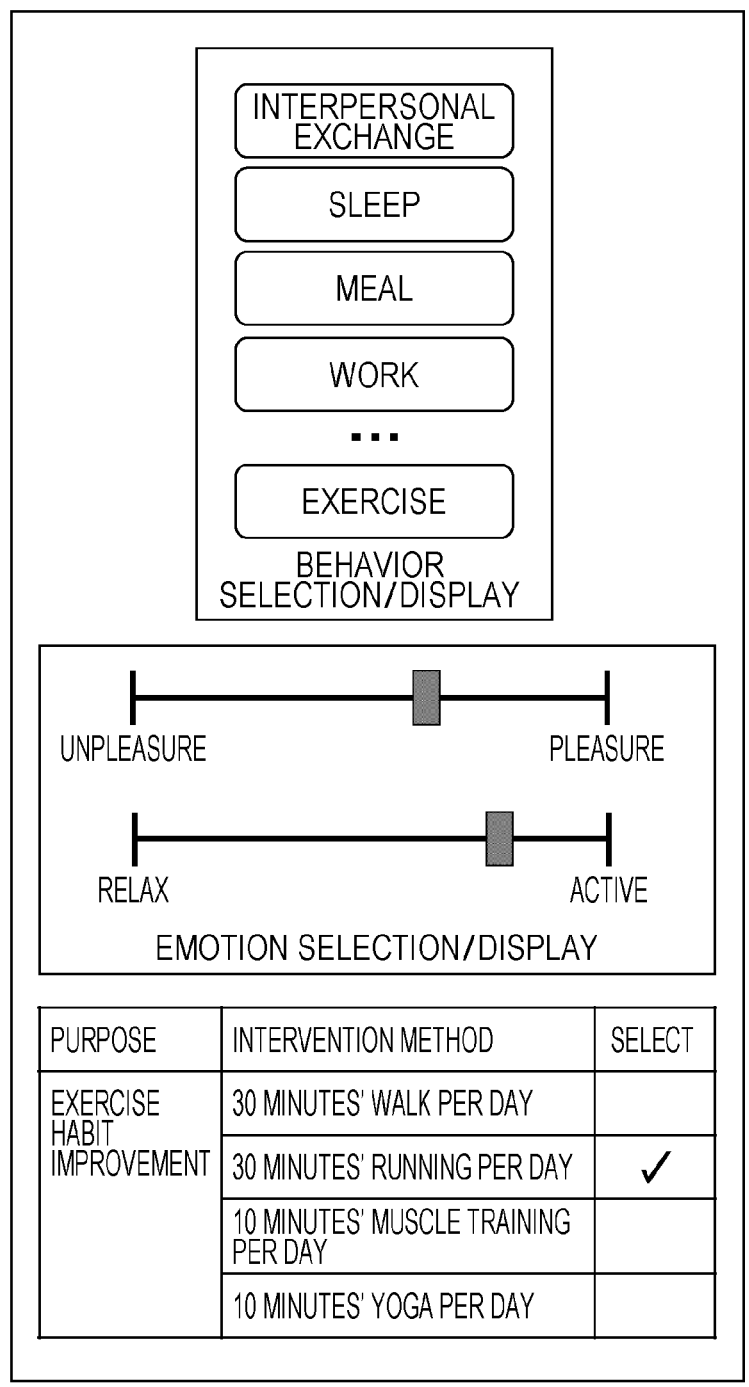
FIG. 10A is a view illustrating an example of an input screen displayed on an information terminal.

FIG. 10A is a diagram illustrating an example of the input screen displayed on the information terminal 110.

The input screen includes a behavior input region 1101, an emotion input region 1102, and an intervention input region 1103. The behavior input region 1101 includes, for example, selection buttons for interpersonal exchange, sleep, meal, work, exercise, and the like, and the user inputs behavior by operating a button corresponding to the current behavior. The emotion input region 1102 is provided with a slide bar related to a plurality of emotions, and the user operates the slider to select a degree of unpleasure/pleasure or relax/active. The intervention input region 1103 includes a selection field of an intervention method for each purpose, and selects the intervention method performed by the user.

Figure 10B:
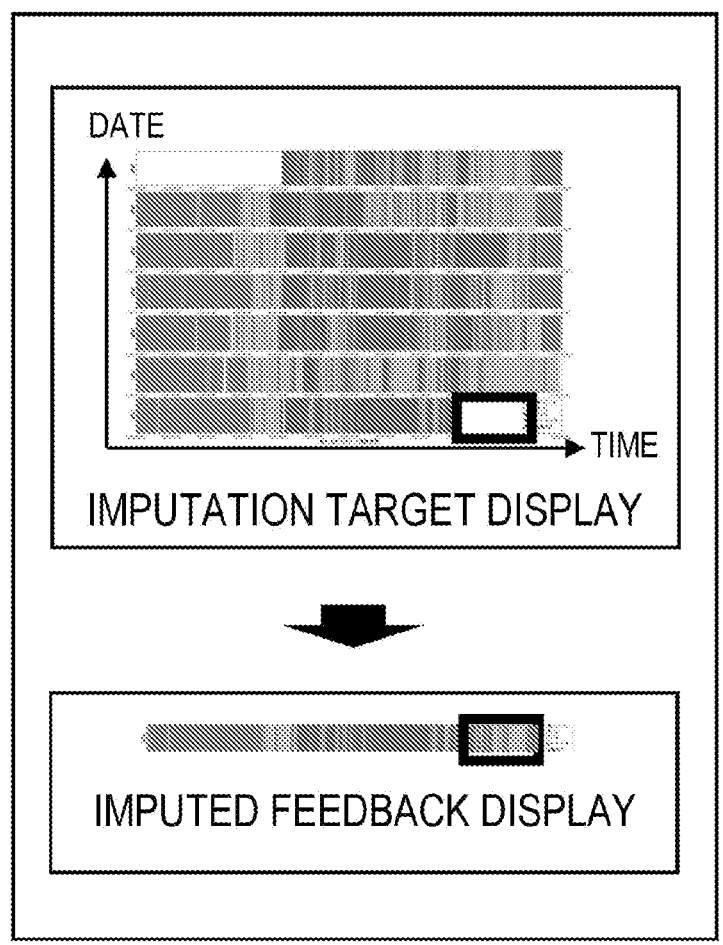
FIG. 10B is a view illustrating an example of an output screen displayed on the information terminal.

FIG. 10B is a diagram illustrating an example of the output screen displayed on the information terminal 110.

The output screen includes an imputation target display region 1105 and an imputed feedback display region 1106. The imputation target display region 1105 displays, in a graph region having two axes of date and time, sensor data and a region in which sensor data are missing. The imputed feedback display region 1106 displays the imputed sensor data.

Figure 11:
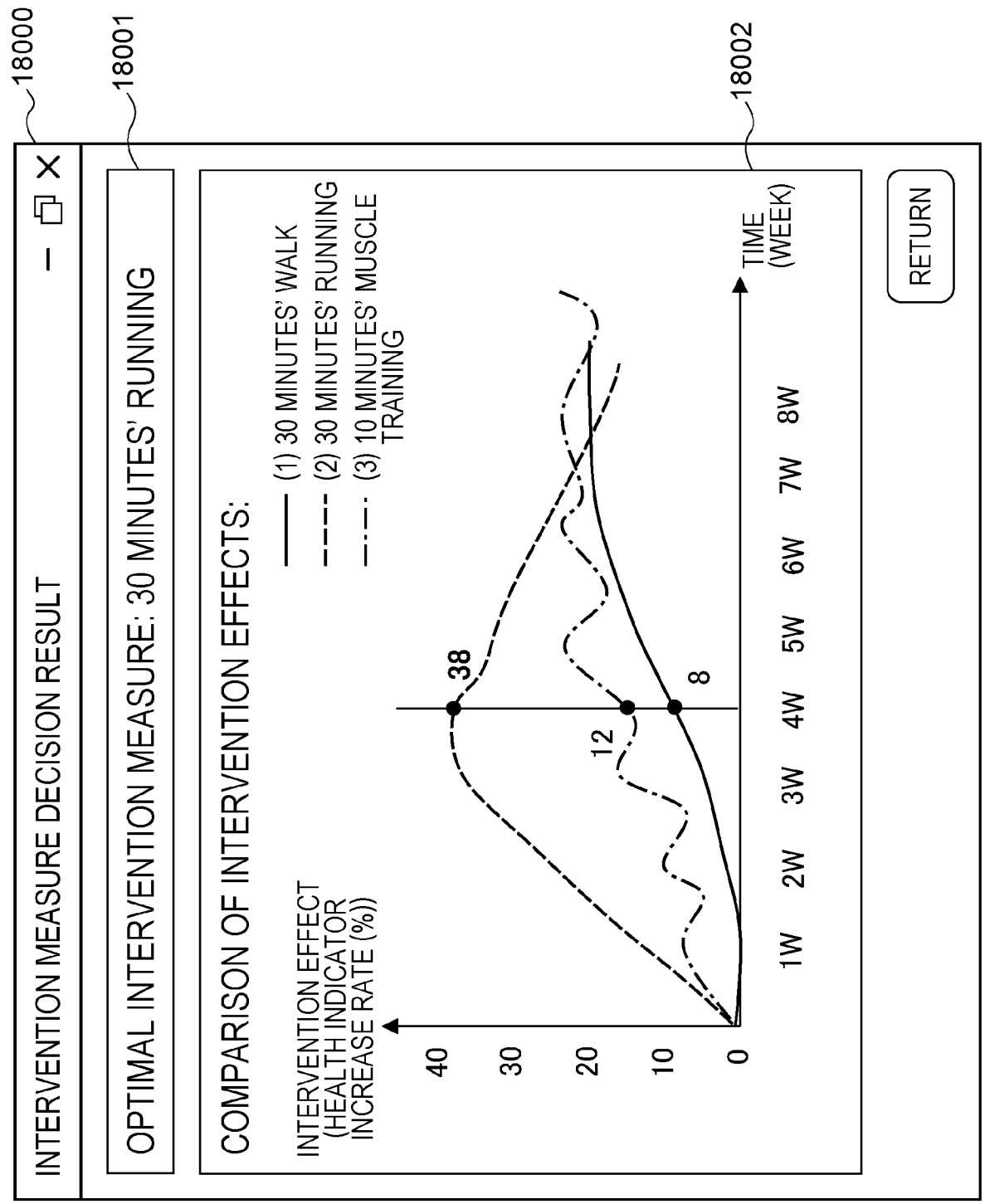
FIG. 11 is a diagram illustrating an example of an intervention measure decision result screen displayed on the information terminal.

FIG. 11 is a diagram illustrating an example of an intervention measure decision result screen 1300 displayed on the information terminal 110.

The intervention measure decision result screen 1300 presents the most effective, optimal intervention measure at the top. A lower part of the intervention measure decision result screen 1300 presents a difference in intervention effect (activity productivity increase rate expressed in percent) by an intervention candidate. Specifically, it is indicated that after 4 weeks from the start of intervention, there is an improvement of (1) 8% in 30 minutes' walk, (2) 38% in 30 minutes' running, and (3) 12% in 10 minutes' muscle training.

As described above, in Example 1 of the present invention, since the missing data is predicted using the graph feature 2030 of the graph 2028 generated from the sensor data 2021, the mask data 2022, the behavior/emotion data 2025, the user attribute data 2026, and the history data 2027 of intervention method and intervention effect, accurate missing data with less data loss can be predicted.

Since the updated parameter 2012 is generated such that the training loss calculated from the data imputation loss 2002, the confounder adjustment loss 2006, and the predicted loss 2009 becomes minimized, the accuracy of imputation by the model can be improved by adjustment of a plurality of loss functions.

Example 2

Next, Example 2 of the present invention will be described. In Example 1 described above, the user inputs metadata such as behavior and emotion, but in Example 2, a behavior/emotion discriminator 2013 discriminates behavior and emotion of the user from the user data 220 (particularly, sensor data). In Example 2, the same configurations and processing as those of Example 1 described above are denoted by the same reference numerals, and the description thereof will be omitted.

Figure 12:
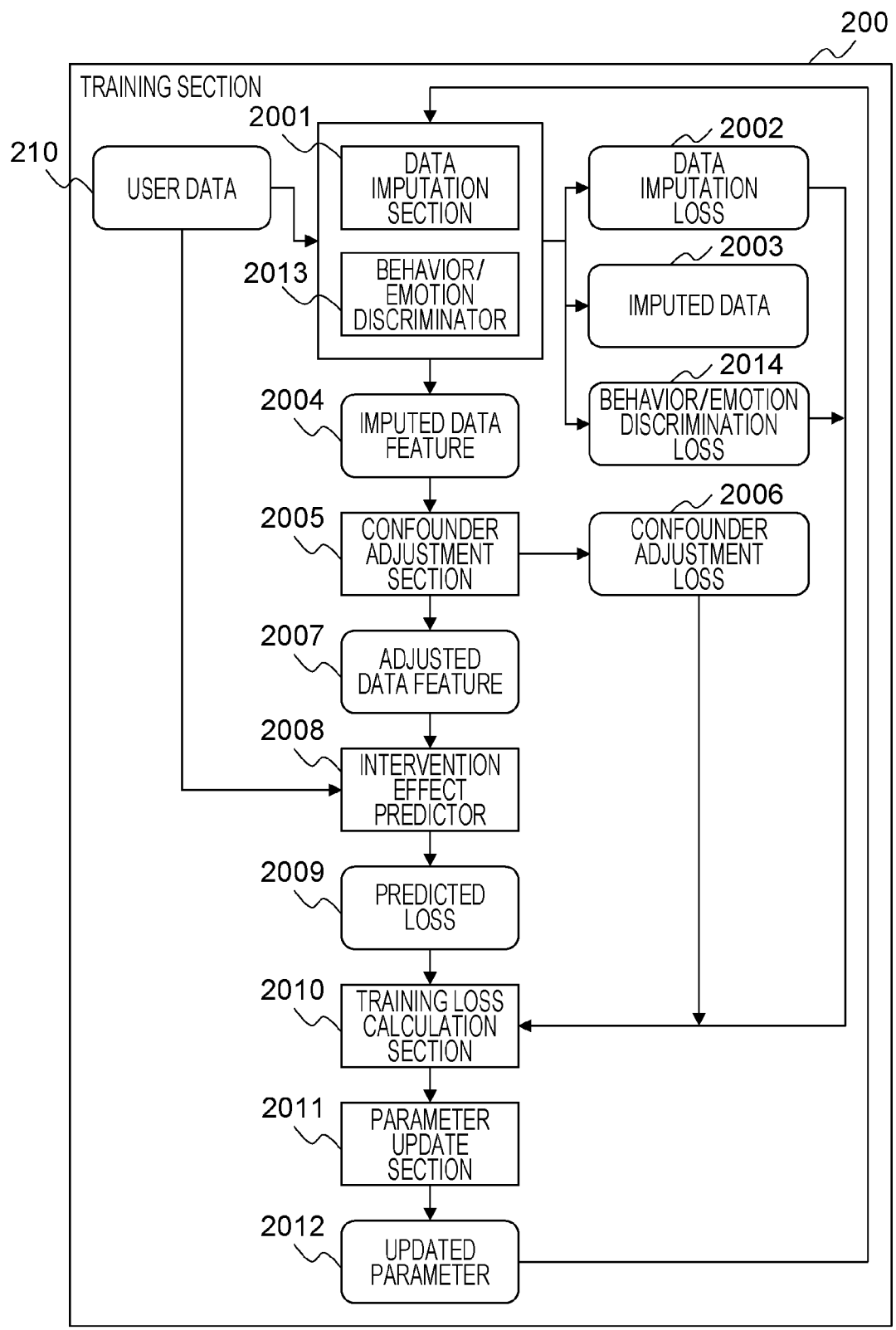
FIG. 12 is a diagram illustrating a configuration of a training section of Example 2.

FIG. 12 is a diagram illustrating the configuration of the training section 200 of Example 2.

The training section 200 includes the data imputation section 2001, the behavior/emotion discriminator 2013, the confounder adjustment section 2005, the intervention effect predictor 2008, the training loss calculation section 2010, and the parameter update section 2011, and trains a model using sensor data without missing.

The data imputation section 2001 generates a data imputation model for inferring and imputing a missing portion of the user data 220 including missing having been input such that a data imputation loss 2002 becomes minimized, generates an imputed data feature 2004 using the generated data imputation model, and generates an imputed data feature 2003 on the basis of the generated imputed data feature 2004. The processing of the data imputation section 2001 will be described later with reference to FIG. 13.

The behavior/emotion discriminator 2013 generates a behavior/emotion discrimination model for generating behavior and emotion data from the feature of the sensor data of the user data 220 such that the behavior/emotion discrimination loss 2014 becomes minimized, generates behavior and emotion data using the generated behavior/emotion discrimination model, calculates the feature of the behavior and emotion data from the generated behavior and emotion data, and adds the calculated feature to the imputed data feature 2004. That is, the behavior/emotion discriminator 2013 discriminates the behavior/emotion while the data imputation section 2001 imputes the data.

The confounder adjustment section 2005 generates a confounder adjustment model for generating the adjusted data feature 2007 from the imputed data feature 2004 on the basis of the confounder between data items such that the confounder adjustment loss 2006 becomes minimized, and generates the adjusted data feature 2007 from the imputed data feature 2004 using the generated confounder adjustment model.

The intervention effect predictor 2008 generates the predicted loss 2009 from the user data 220.

The training loss calculation section 2010 calculates the training loss from the data imputation loss 2002, the confounder adjustment loss 2006, and the behavior/emotion discrimination loss 2014.

The parameter update section 2011 generates the updated parameter 2012 such that the calculated training loss becomes minimized. By updating an inference model (a data imputation model and a confounder adjustment model) with the generated updated parameter 2012, it is possible to generate a model with a small loss, that is, capable of inference close to the correct answer data.

Figure 13:
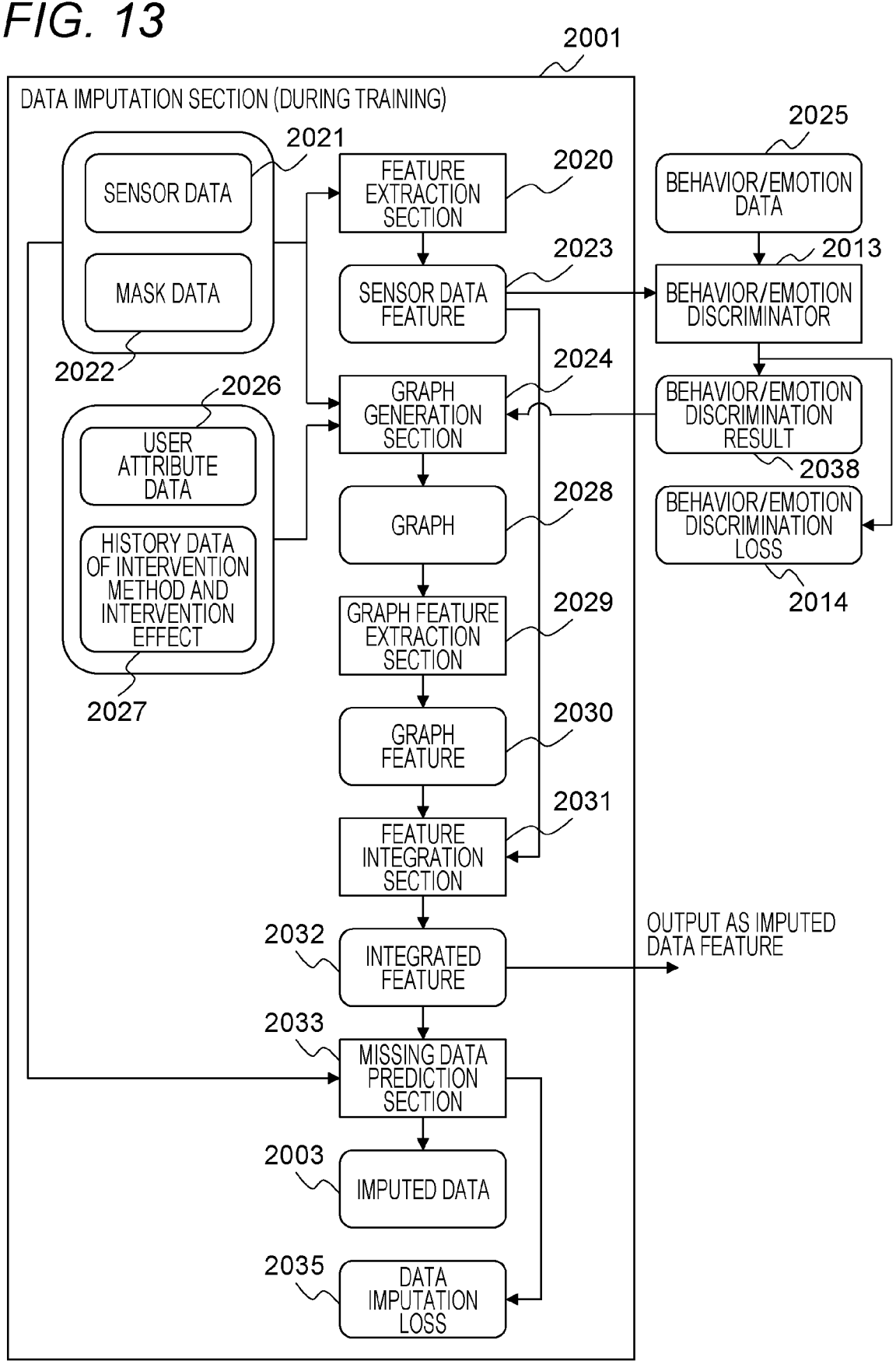
FIG. 13 is a diagram illustrating a configuration of a data imputation section of Example 2 at the time of training.

FIG. 13 is a diagram illustrating the configuration of the data imputation section 2001 of Example 2 at the time of training.

The data imputation section 2001 includes the feature extraction section 2020, the graph generation section 2024, the graph feature extraction section 2029, the feature integration section 2031, and the missing data prediction section 2033.

The feature extraction section 2020 generates the sensor data feature 2023 from the sensor data 2021, and generates the sensor data feature 2023 from the mask data 2022 in which a part of the sensor data 2021 is missing. That is, the sensor data feature 2023 includes the feature of the sensor data 2021 and the feature of the mask data 2022. The mask data 2022 is training data that is partially missing by applying a random mask to the sensor data 2021. The sensor data 2021 is used for training as correct answer data of the data missing by the mask.

Using the sensor data feature 2023 and the behavior/emotion data 2025, the behavior/emotion discriminator 2013 performs training such that the behavior/emotion discrimination loss 2014 becomes minimized, and generates a behavior/emotion discrimination model. Then, using the generated behavior/emotion discrimination model, a behavior/emotion discrimination result 2038 and the behavior/emotion discrimination loss 2014 are generated from the sensor data feature 2023.

The graph generation section 2024 generates the graph 2028 from the sensor data 2021, the mask data 2022, the behavior/emotion data 2025, the user attribute data 2026, and the history data 2027 of intervention method and intervention effect. The generated graph 2028 is as described above with reference to FIG. 6.

The graph feature extraction section 2029 extracts the graph feature 2030 from the generated graph 2028. The graph feature 2030 includes a node feature representing the property of a node itself and an edge feature indicating an adjacency relationship between nodes by the edge.

The feature integration section 2031 calculates the integrated feature 2032 by integrating the generated sensor data feature 2023 and the extracted graph feature 2030. The calculated integrated feature 2032 is output as the imputed data feature 2004.

Using the sensor data 2021, the mask data 2022, the integrated feature 2032, and the imputed data 2003, the missing data prediction section 2033 performs training such that the data imputation loss 2002 becomes minimized, and generates a data imputation model. Then, using the generated data imputation model, the imputed data 2003 is generated from the sensor data 2021, the mask data 2022, and the integrated feature 2032.

Figure 14:
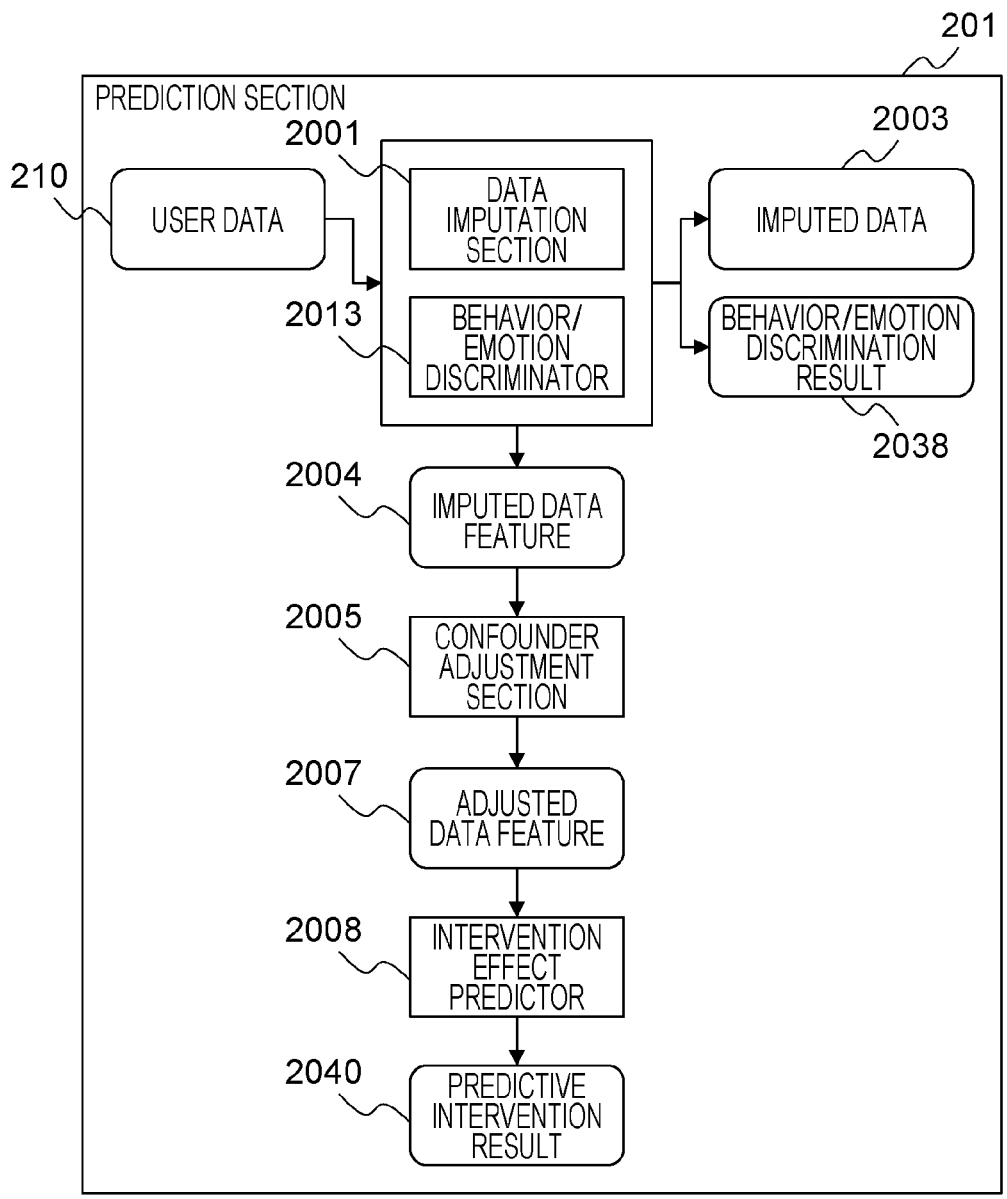
FIG. 14 is a diagram illustrating a configuration of a prediction section of Example 2.

FIG. 14 is a diagram illustrating the configuration of the prediction section 201 of Example 2.

The prediction section 201 has the data imputation section 2001, the behavior/emotion discriminator 2013, the confounder adjustment section 2005, and the intervention effect predictor 2008, and predicts the intervention effect from the user data 220. The data imputation section 2001, the behavior/emotion discriminator 2013, the confounder adjustment section 2005, and the intervention effect predictor 2008 have the same configurations as those of the training section 200.

Using the trained data imputation model, the data imputation section 2001 imputes a missing portion of the user data 220 including missing having been input, generates the imputed data 2003, and calculates the imputed data feature 2004 from the generated imputed data 2003. The processing of the data imputation section 2001 will be described later with reference to FIG. 15.

Using the trained behavior/emotion discrimination model, the behavior/emotion discriminator 2013 discriminates behavior and emotion from the feature of the sensor data of the user data 220 and generates the behavior/emotion discrimination result 2038.

Using the trained confounder adjustment model, the confounder adjustment section 2005 generates the adjusted data feature 2007 from the imputed data feature 2004.

The intervention effect predictor 2008 generates the predictive intervention result 2040 from the user data 220.

Figure 15:
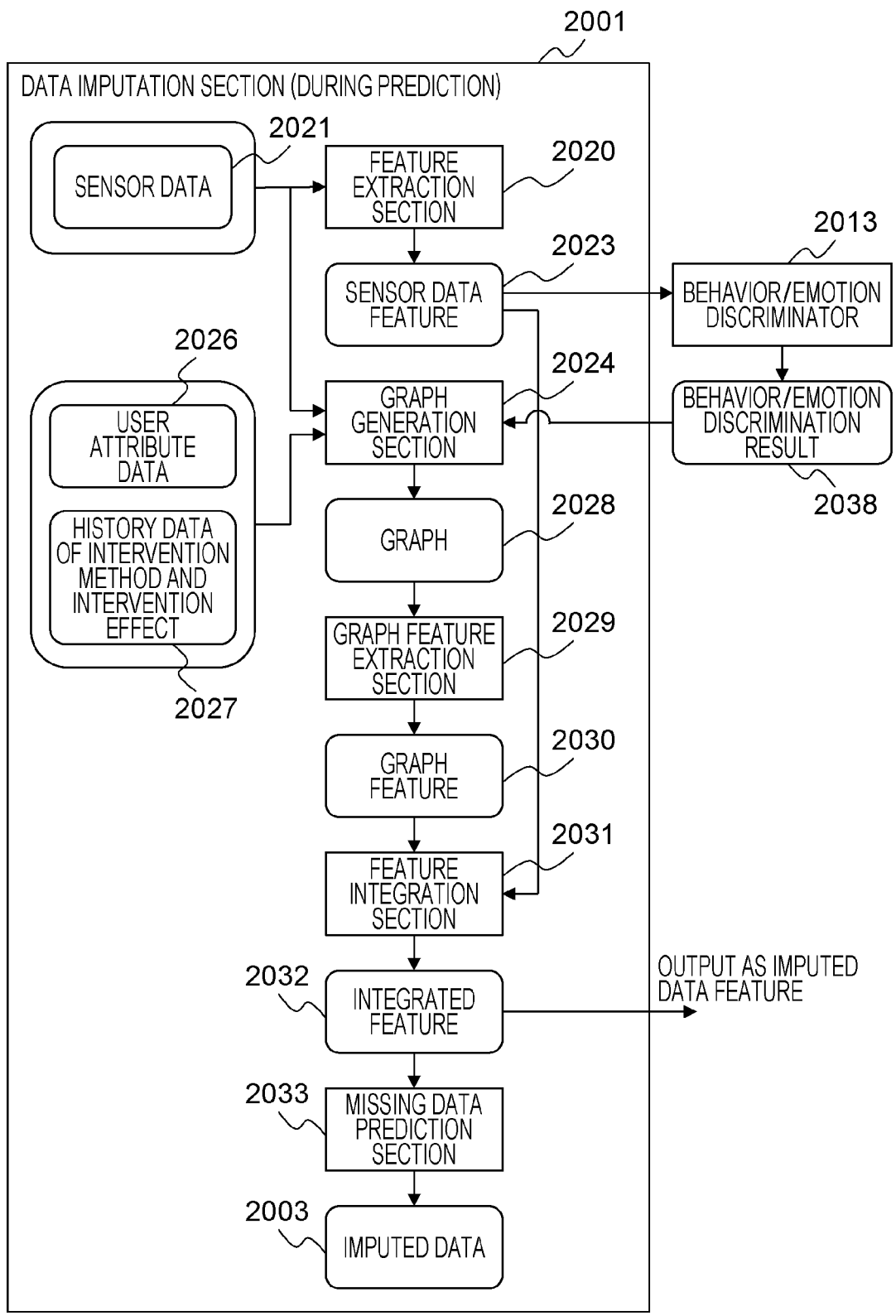
FIG. 15 is a diagram illustrating a configuration of the data imputation section of Example 2 at the time of predictive inference.

FIG. 15 is a diagram illustrating a configuration of the data imputation section 2001 of Example 2 at the time of predictive inference.

The feature extraction section 2020 generates the sensor data feature 2023 from the sensor data 2021.

Using the trained behavior/emotion discrimination model, the behavior/emotion discriminator 2013 generates the behavior/emotion discrimination result 2038 from the sensor data feature 2023.

The graph generation section 2024 generates the graph 2028 from the sensor data 2021, the behavior/emotion discrimination result 2038, the user attribute data 2026, and the history data 2027 of intervention method and intervention effect. The generated graph 2028 includes nodes corresponding to data items input to the graph generation section 2024 and edges coupling the nodes with one another.

The graph feature extraction section 2029 extracts the graph feature 2030 from the generated graph 2028. The graph feature 2030 includes a node feature representing the property of a node itself and an edge feature indicating an adjacency relationship between nodes by the edge.

The feature integration section 2031 calculates the integrated feature 2032 by integrating the generated sensor data feature 2023 and the extracted graph feature 2030. For example, an n+m-dimensional feature is generated by coupling an n-dimensional sensor data feature 2023 and an m-dimensional graph feature 2030. A one-dimensional convolution operation of a known neural network is performed on the coupled feature to generate a p-dimensional integrated feature 2032. The parameters of the convolution operation are part of the parameters of the data imputation model. The calculated integrated feature 2032 is output as the imputed data feature 2004. Integration of the sensor data feature 2023 and the graph feature 2030 representing the correlation of the user data 220 enables data imputation in consideration of the correlation among data, and can improve the accuracy of confounder adjustment and causal inference in intervention effect prediction.

The missing data prediction section 2033 generates a missing data prediction result 2034 from the integrated feature 2032.

As described above, in Example 2 of the present invention, since the behavior and emotion data is discriminated from the sensor data feature 2023, it is possible to omit time and effort for the user to input behavior and emotion data.

The present invention is not limited to the above-described examples, but includes various modifications and equivalent configurations within the scope of the appended claims. For example, the above-described examples have been described in detail for the purpose of explaining the present invention in an easy-to-understand manner, and the present invention is not necessarily limited to those including all the configurations described above. The configuration of a certain example may be replaced partly by the configuration of another example. The configuration of another example may be added to the configuration of a certain example. Another configuration may be added to, deleted from, or substituted for a part of the configuration of each example.

Some or all of the above-described configurations, functions, processing sections, processing means, and the like may be implemented by hardware by being designed as an integrated circuit or the like, or may be implemented by software by a processor interpreting and executing a program for implementing each function.

Information such as a program, a table, and a file for implementing each function can be stored in a storage device such as a memory, a hard disk, and a solid state drive (SSD), or a recording medium such as an IC card, an SD card, and a DVD.

Control lines and information lines that are considered necessary for the description are illustrated, and not necessarily all the control lines and information lines essential for implementation are illustrated. In practice, almost all configurations may be considered to be interconnected.

What is claimed is:

1. An information processing system comprising:
    a calculation device that executes a program; and
    a storage device that stores the program, wherein
        the storage device stores user data that includes sensor data that is biological information of a user measured by a sensor device and data collected in association with the sensor data, and
        the calculation device
            acquires the sensor data,
            applies a random mask to the sensor data to create mask data, and
            imputes the sensor data and the mask data using a causal relationship between items of the user data.

2. The information processing system according to claim 1, wherein
    the user data includes at least one of a user's behavior, emotion, biological information, and an intervention measure.

3. The information processing system according to claim 1, wherein
    the user data can be represented by a graph structure representing a causal relationship among items of the user data, and
    the calculation device imputes the sensor data using a feature of the graph structure.

4. The information processing system according to claim 1, wherein
    the sensor data is represented by a numerical value.

5. The information processing system according to claim 1, wherein
    behavior and emotion data of the user is input by the user.

6. The information processing system according to claim 1, wherein
    the calculation device discriminates behavior and emotion data of the user from the sensor data.

7. The information processing system according to claim 1, wherein
    the calculation device determines a parameter of a model so as to minimize a training loss that is calculated from a data imputation loss in imputation of the sensor data, a confounder loss in adjustment of a data feature using a confounder representing a relationship among items of the user data, and a predicted loss in prediction of an intervention effect from the user data.

8. The information processing system according to claim 7, wherein
    the calculation device adjusts a confounder so as to minimize a loss of a confounder representing a relationship among items of the user data, and predicts an intervention effect.

9. An information processing method for an information processing system to impute sensor data, wherein
    the information processing system includes a computer that has a calculation device that executes predetermined processing and a storage device that is connected to the calculation device,
    the storage device stores user data that includes sensor data that is biological information of a user measured by a sensor device and data collected in association with the sensor data, and
    the information processing method includes
        acquiring, via the calculation device, the sensor data,
        applying a random mask to the sensor data to create mask data, and
        imputing, via the calculation device, the sensor data and the mask data using a causal relationship between items of the user data.

* * * * *